May 29, 1973  J. W. FELDER, JR., ET AL  3,736,215
METHOD AND APPARATUS FOR FABRICATING
GLASS FIBER CUSHIONING MATERIAL
Filed Aug. 11, 1971  4 Sheets-Sheet 4

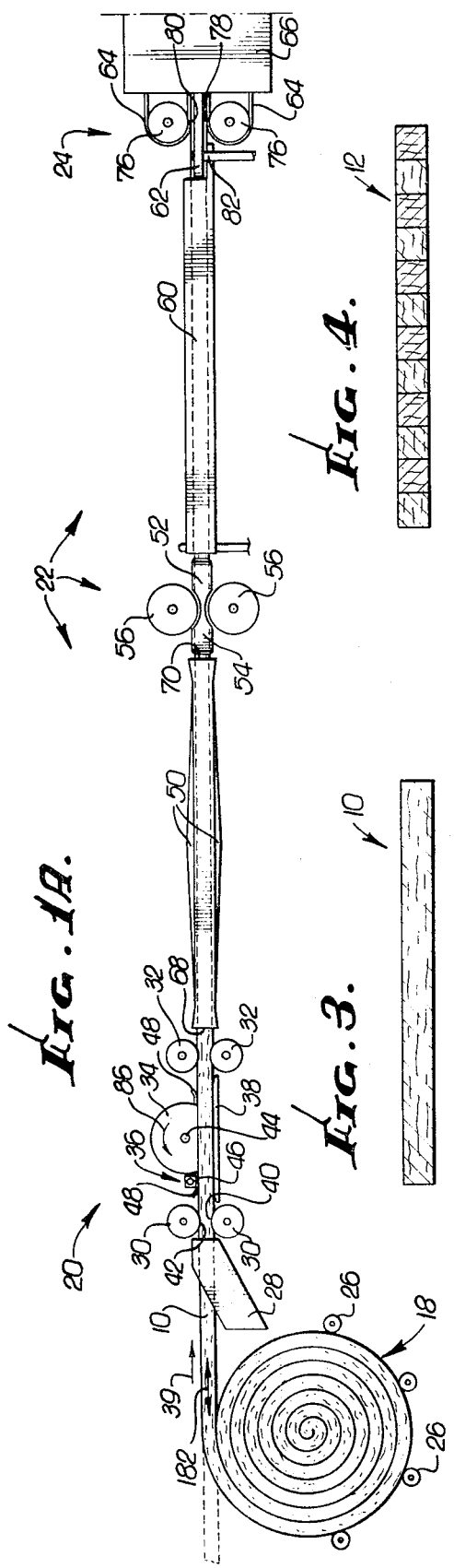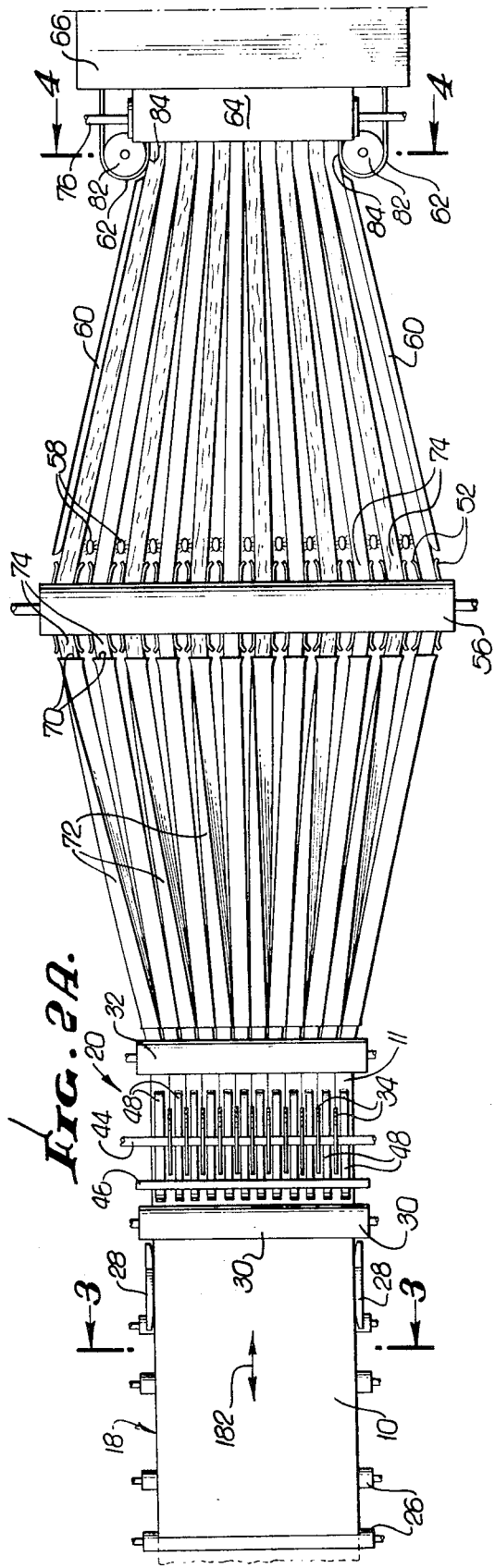

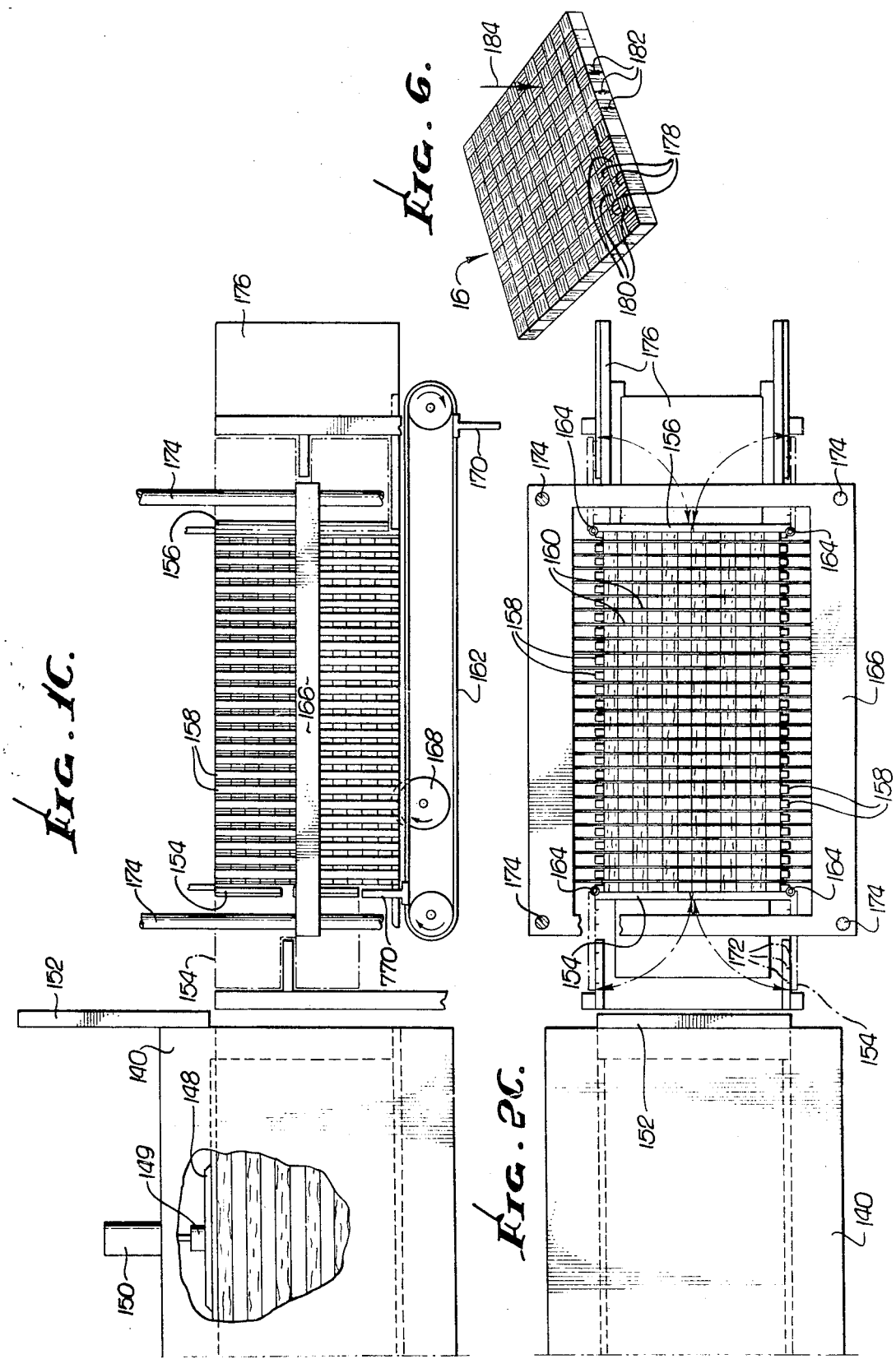

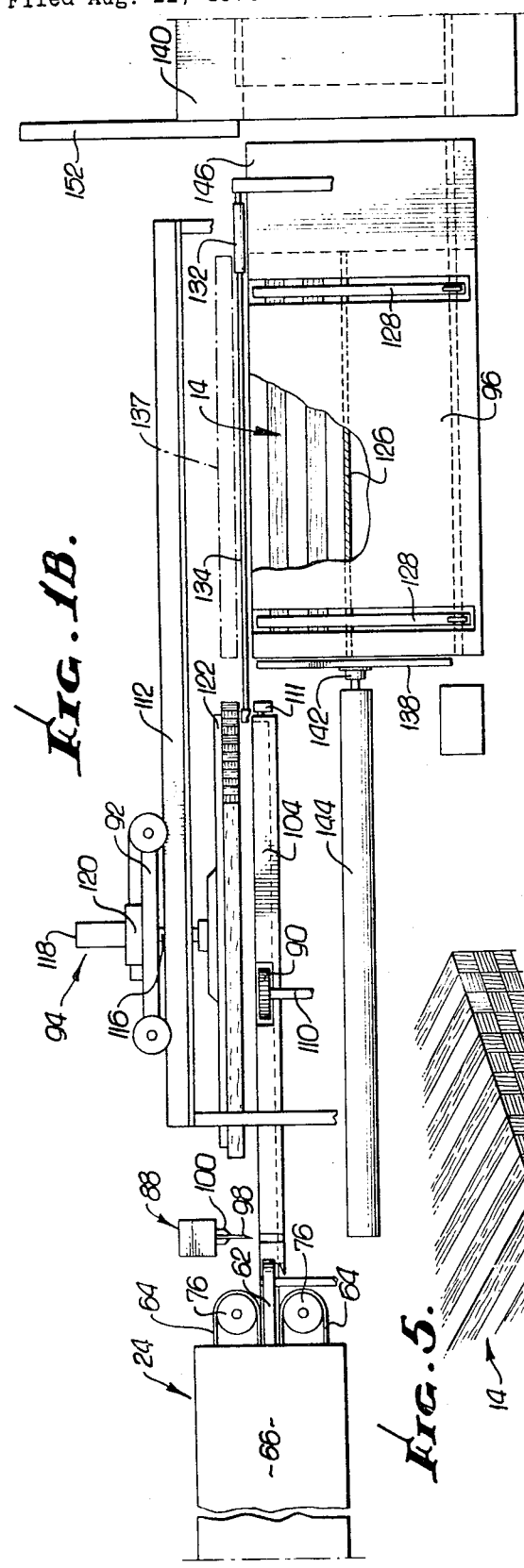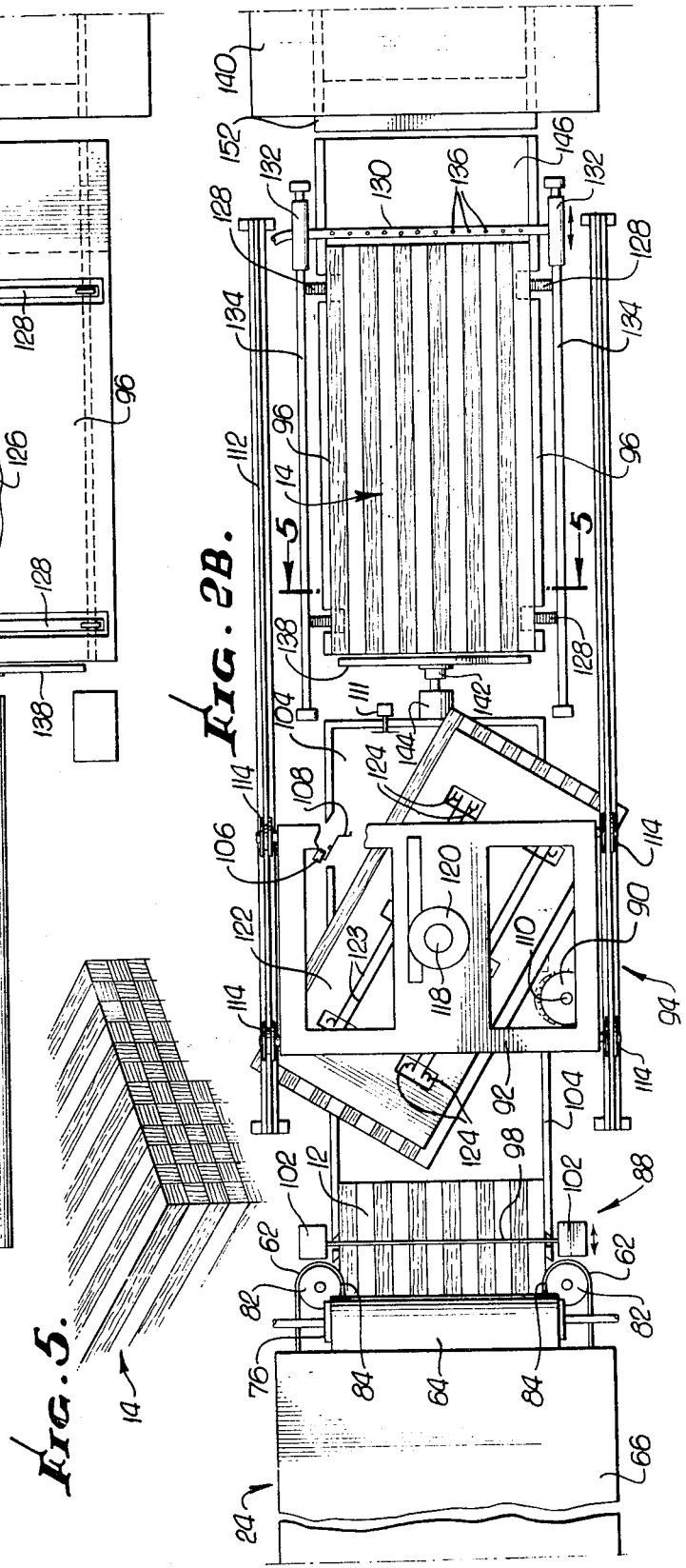

United States Patent Office 3,736,215
Patented May 29, 1973

3,736,215
METHOD AND APPARATUS FOR FABRICATING GLASS FIBER CUSHIONING MATERIAL
John W. Felder, Jr., Palos Verdes Peninsula, and Sterling Barnett, Sepulveda, Calif., assignors to L. S. Associates, Inc., Torrance, Calif.
Filed Aug. 11, 1971, Ser. No. 170,824
Int. Cl. B32b *3/10, 3/14, 5/12, 31/06, 31/18*
U.S. Cl. 161—36
14 Claims

ABSTRACT OF THE DISCLOSURE

Method and apparatus for fabricating an improved glass fiber multisectioned cushioning material with laminae of adjacent sections normal to each other having uniform alignment of fibers in a primary load direction. Continuously moving the glass fiber forwardly while simultaneously performing different steps on different portions of the glass fiber including slitting the glass fiber into longitudinal strips, assembling the strips into a single-layered structure with the laminae of the adjacent strips normal to each other, assembling a plurality of single-layered structures into a multilayered structure with the laminae of adjacent strips normal to each other, and slicing crosswise through the multilayered structures.

---

The present invention relates generally to cushioning elements and materials, and more particularly to a unique automated method and apparatus for making improved multisectioned cushioning material out of glass fiber.

Some prior art uses of glass fiber batting in seat cushions is disclosed in United States Letters Patent Nos. 2,722,268 and 3,000,020. Reference is made therein to some of the inherent advantages of glass fiber batting over conventional cushioning materials. Glass fiber is lightweight, fireproof, nontoxic, resists mildew, and produces negligible noxious fumes and smoke when exposed to fire. These known advantages were only superficially exploited through a rather crude multisectioned cushioning material hand-cut from glass fiber batting and manually assembled into a plurality of upstanding laminar columns. Under the circumstances, making such multisectioned cushioning material was excessively expensive and time-consuming, and provided an imprecise non-uniform product of limited use.

Accordingly, it is a general object of the invention to overcome the foregoing problems by discovering and developing an improved multisectioned glass fiber material adaptable for use as an all-purpose cushioning material for seats, containers, and the like, and to provide a rapid efficient, inexpensive automated method and apparatus for making such a material.

It is another general object of the invention to provide an improved resilient cushioning material made from glass fiber batting which tends to promote uniform loading over the contact area independent of the deflection of the cushioning material. A related object is to provide an automated method and apparatus for fabricating such an improved glass fiber cushioning material in various dimensions and configurations, and with diverse load characteristics.

Another object of the invention is to provide an improved multisectioned glass fiber cushioning material having laminae of adjacent sections normal to each other with the directions of uniform fiber alignment for each laminae disposed in a primary load direction, and to provide a method and apparatus for making such a material.

Another object of the invention is to provide an improved cushioning material which can be easily modified and tailored to meet diverse performance requirements for different products being packaged for shipment and storage in competition with more conventional cushioning materials such as flexible and rigid foams, corrugated cardboard, metal springs, and the like.

A more specific object of the invention is to provide a method of fabricating an improved multisectioned cushioning material in which all of the steps are performed simultaneously on different portions of glass fiber moving continuously in a forward direction, including the steps of slitting glass fiber batting having essentially horizontal laminae into longitudinal strips, orienting and bonding the strips into a single-layered structure with the laminae in adjacent strips normal to each other, cutting plank members from the single-layered structure and orienting and bonding them together in a multilayered structure with laminae in adjacent strips normal to each other, and slicing cross-sectional pieces therefrom.

Another specific object of the invention is to provide apparatus for performing the aforementioned steps without interfering with the forward progress of the glass fiber, including longitudinal and lateral cutting means for slitting, cutting, and sectioning the glass fiber, and means for orienting and bonding sections of the glass fiber material with laminae of adjacent sections normal to each other.

It is a further specific object to provide cutter means which do not generate undue heat, damage the glass fibers, or deviate from a predetermined cutting path because of the diverting effect of the laminae, and to provide orienting means which precisely positions both upper and lower surfaces and both side surfaces, respectively, of the glass fiber in parallel linear planes, and to provide bonding means which applies and cures adhesive on all contiguous surfaces of adjacent glass fiber strips.

Another specific object of the invention is to provide an improved multisectioned cushioning material capable of diverse performance characteristics by variation of glass fiber batting density, type of binder, fiber characteristics and also the position, size, number and relative location of cushioning material sections. A related object is to provide an improved material capable of exhibiting almost any desired response for cushioning persons on seat cushions and mattresses, as well as products packaged for shipment and/or storage.

Further purposes, objects, features and advantages of the invention will be evident to those skilled in the art from the following description of the preferred embodiment of the invention and alternate forms thereof.

In the drawings:

FIGS. 1A, 1B and 1C together constitute a side view of a preferred embodiment of an apparatus for practicing a method of fabricating glass fiber cushioning material;

FIGS. 2A, 2B and 2C together constitute a top view of the preferred embodiment of FIGS. 1A, 1B and 1C;

FIG. 3 is a sectional view taken along line 3—3 in FIG. 2A showing glass fiber batting in its initial condition;

FIG. 4 is a sectional view taken along line 4—4 in FIG. 2A showing the orientation of glass fiber batting into a single-layered structure;

FIG. 5 is an isometric view taken at line 5—5 in FIG. 2B showing the reorientation of glass fiber batting into a multilayered structure;

FIG. 6 is an isometric view showing an improved cushioning material of glass fiber cut crosswise from the multi-layered structure of FIG. 5;

Figure 7A:
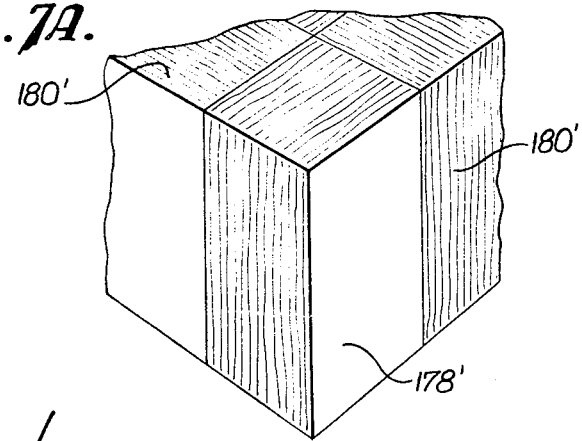
FIGS. 7A, 7B and 7C show some variations and combinations of the cushioning material of FIG. 6.

Generally speaking, the invention provides a unique method and apparatus for utilizing glass fiber batting 10 having substantially horizontal laminae by slitting it to form strips 11 of equal width, assembling the strips initially into a single-layered structure 12 (see FIG. 4) and ultimately into a multilayered structure 14 (see FIG. 5) with laminae of adjacent strips normal to each other, and slicing crosswise through such multilayered structures to form an improved multisectioned cushioning material 16 (see FIG. 6). This improved cushioning material can be varied and combined together (see FIGS. 7A, 7B and 7C) to meet almost any desired size and performance specifications. Furthermore, this unique construction, as discussed in more detail hereinafter, exhibits better cushioning characteristics than conventional cushioning materials (see FIG. 9).

Referring more particularly to FIGS. 1A and 2A, the apparatus for making and assembling the single-layered structure 12 includes, in the illustrated form, a batting cradle 18, a longitudinal cutter device 20, a reorientation device 22 and a bonding device 24.

The batting cradle 10 includes a series of horizontal cradle rollers 26 and a guide chute 28. The longitudinal cutter device 20 includes first and second drive rollers 30 and 32, circular blades 34, a finger member 36, a bed plate 38 and a support frame (not shown).

Unless otherwise indicated, the various elements herein are suitably mounted and positioned by conventional fasteners to the support frame. In this regard, the bed plate 38 is horizontally positioned and extends both longitudinally and laterally relative to the direction of travel 39 of the glass fiber batting to provide a support surface underlying the glass fiber batting 10 and also defining a primary reference plane for the invention. The first drive rollers 30 are located immediately before the bed plate 38 with a lower roller contact area 40 substantially aligned with the reference plane, and an upper roller contact area 42 spaced upwardly a distance slightly less than the thickness of the glass batting 10, both rollers being coated with soft rubber for frictional engagement with the glass fiber batting. Similar second drive rollers 32 are similarly positioned immediately after the bed plate 38. Both the bed plate 38 and the first and second drive rollers 30, 32 extend to and, preferably, slightly beyond the side boundaries of the glass fiber batting 10. The circular blades 34 are spaced apart a distance substantially the same as the thickness of the glass fiber batting 10, and are mounted on a horizontal drive axle 44 for rotation normal to the reference plane with the bottom portion of the blades rotating through matching grooves in the bed plate. The finger member 36 includes a rod 46 extending laterally across the bed plate 38 immediately behind the circular blades 34 and fingerlike projections 48 extending forwardly adjacent both sides of each circular blade 34 at a distance above the bed plate 38 substantially the same as the thickness of the glass fiber batting 10. The cradle rollers 26 are mounted in a semicircular pattern behind and below the inclined guide chute 28 which terminates just before the first drive rollers 30.

It is important to use glass fiber batting 10 which has a direction of uniform fiber alignment, and to mount the longitudinal cutter device 20 for slitting in that direction. This assures that all sections of the improved cushioning material 16 will have a uniform fiber alignment in the primary load direction. In this regard, the preferred glass batting has essentially horizontal laminae with fibers primarily aligned longitudinally.

The reorientation device 22 and the bonding device 24 are successively positioned after the longitudinal cutter device 20 in the path of travel of the glass fiber batting 10. The reorientation device 22 includes twisting chutes 50, forward and rearward guides 52 and 54, third drive rollers 56, spray nozzles 58 and side rails 60. The bonding assembly 24 includes vertical and horizontal drive belts 62 and 64 and a first oven 66.

The twisting chutes 50 are each disposed in the primary reference plane with an entrance 68 immediately after the second drive rollers 32 and diverge laterally in the forward direction so that exits 70 of the twisting chutes are spaced from each other. Alternate chutes 72 are twisted through ninety degrees (90°) of rotation between their entrances 68 and exits 70. The third drive rollers 56, mounted after the exits 70, are similar in structure and location to the first and second drive rollers 30, 32, but are longer to accommodate the expanded width of the divergent strips 74 of glass fiber batting emerging from the exits. The forward and rearward guides 52, 54 are situated in the primary reference plane before and after the third drive rollers 56. The spray nozzles 58 are located in the primary reference plane, after the forward guides 52, between each of the glass batting strips 74, and include double nozzles directed toward opposing surfaces of adjacent strips. Of course, the invention is not limited to the particular twisting chutes 50 shown, so long as the strips 11 of glass fiber are oriented in a single-layered structure with the laminae of adjacent strips normal to each other, without interfering with the forward movement of the glass fiber.

The side rails 60 converge on each side of the moving strip 74 from a wide separation distance in the vicinity of the spray nozzles 58 to a normal separation distance equal to the original width of the glass fiber batting 10. The horizontal drive belts 64 extend from the narrow end of the side rails 60 forwardly through the first oven 66, and are shown as continuous belts mounted on horizontal axles 76 so that lower and upper contact surfaces 78 and 80 are positioned the same as lower and upper contact surfaces 40 and 42, relative to the primary reference plane. The vertical drive belts 62 are correspondingly mounted and positioned on vertical axles 82 with lateral contact surfaces 84 spaced apart about five percent (5%) less than the initial width of the glass batting 10. Both drive belts preferably incorporate a perforated Teflon coating which permits free passage of evaporating solvent away from the adhesive which is drying between adjacent strips 74.

Referring now to the actual operation of the first portion of the invention, the glass fiber batting 10 is fed continuously and automatically from the batting cradle 18 successively through the longitudinal cutter device 20, the reorientation device 22 and the bonding device 24 to produce the multisectioned structure 12 shown in FIG. 4 with the laminae of directly adjacent sections normal to each other.

More specifically, the glass fiber batting 10 in the form of a roll, although it may be supplied directly from a fabricating machine for making glass fiber batting, is mounted in the cradle rollers 26 and its loose end fed through the guide chute 28, between the first drive rollers 30, and then under the finger member 36 to contact the circular blades 34. Upon actuating a drive motor, or the like (not shown), the first and second drive rollers 30, 32 and the circular blades 34 commence rotation sending the glass fiber batting forwardly past the rotating cutting edges of the circular blades 34. In the preferred embodiment disclosed herein, the glass fiber batting is about two inches thick and the individual blades 34 are spaced about two inches apart with a working radius greater than the two-inch thickness of the glass fiber batting. More specifically, it has been found desirable to use eight-inch diameter steel blades sharpened to a knife-like edge rotating in a direction 86 at a rim velocity slightly greater than a velocity of about thirty (30) feet/minute for the glass batting 10 in order to provide effective cutting without excessive heating of the blades. During the aforesaid cutting operating, the fingerlike projections 48 securely hold the portion of the batting adjacent the rotating blades, thereby resisting any tendency of the glass fiber batting to follow the blades in their circumferential course.

The first and second drive rollers 30 and 32 and the third drive rollers 56 propel the longitudinally slit glass fiber batting into the entrances 68 and out through the exits 70 of the twisting chutes 50. The resulting reoriented composite of strips is then uniformly sprayed on each pair of matching surfaces with a suitable fireproof or fire retardant adhesive, such as water dispersion latex adhesive #2331 manufactured by J. G. Milligan & Company.

The converging action of the side rails 60 and the holding and squeezing act of the vertical and horizontal drive belts 62, 64 assure proper alignment and intimate contact of each strip relative to its immediate neighbor during passage through the first oven 66. The form of the first oven 66 depends on the type of adhesive employed. In the preferred form, where a water-based adhesive is used, an RF-type oven is preferable since it occupies a minimum of space, although a simple forced convection hot air oven could also be used satisfactorily. With highly volatile solvent-based adhesives, simple forced air without heating would be sufficient, so long as suitable traps were provided to prevent emission of solvents into the atmosphere. In every instance, however, the oven dimensions and heat characteristics are coordinated with the velocity of the glass fiber batting and the adhesive utilized to provide adequate curing and setting of the adhesive without interfering with the continuous forward movement of the glass fiber batting.

Referring more particularly now to FIGS. 1B and 2B, the apparatus for making and assembling the multilayered structure 14 includes a lateral cutter 88, accelerator rolls 90, a carriage 92, a rotary drive 94, and a stacking device 96.

The lateral cutter 88 includes a cutting blade 98, a mounting seat 100, a longitudinal adjustor 102, a loading tray 104, and a switch 106. The cutting blade 98 extends laterally across the top edge of the single-layered structure 12 and is mounted on each side through a mounting seat 100 in a longitudinal adjustor 102 carried by the support frame. The loading tray 104 is aligned with the oncoming single-layered structure 12 and has side portions to keep the single-layered structure properly aligned. The switch 106 has an actuating arm 108 extending into the side of the loading tray 104 at the desired cutting distance from the cutting blade 98. The accelerator rolls 90 are mounted on vertical axles 110 on both sides of the loading tray 104, and extend through apertures into the tray so that the space between them is slightly less than the width of the single-layered structure 12. A limit switch 111 is mounted on the forward end of the loading tray 104, and is connected with the drive means (not shown) of the accelerator rolls 90.

The carriage 92 is mounted for parallel overhead tracks 112 by side rollers 114 for travel from a rearward loading position to a forward stacking position. The carriage 92 includes a central vertical axle which connects on its upper end to a lifting device such as a hydraulic cylinder 118 and a conventional rotating device such as a gear housing 120, both of which rest on top of the carriage 92. The central vertical axle carries a rectangular plate 122 with rotatable rods 123 carrying six pair of talon-like fingers 124 for grasping and holding the plank.

The stacking device is located underneath the forward stacking position of the carriage 92 and includes a horizontal stacking tray 126 movably mounted through side apertures of the stacking device 96 to convertional lifting arm 128 for movement from a top empty position to a bottom full position. The stacking device 96 also includes a tubular spray nozzle 130 extending laterally across the stacking device 96 to opposing mounts 132 movable by conventional means from one end of side tracks 134 to the other. A plurality of downwardly directed and upwardly directed apertures 136 are provided in the spray nozzle to assure complete and uniform application of adhesive to the contiguous surfaces of adjacent planks.

During operation of this portion of the preferred form of the invention, the recently bonded single-layered structure 12 emerges from the oven 66 and is propelled forwardly by a vertical and horizontal drive belt 62, 64 underneath the lateral cutting blade 98 and into the first portion of the loading tray 104. Since the position of the actuating arm 108 relative to the position of the lateral cutting blade 98 as determined by the longitudinal adjustor 102 has already been set for the desirable plank length, the forward end of the moving single-layered structure 12 will contact the actuating arm 108 causing the lateral cutting blade 98 to cut down through the single-layered structure to form a plank. As soon as this happens, the high rotary speed of the accelerator rolls 90 moves the plank forward rapidly all the way into the forward end of the loading tray 104 where contact against the limit switch 111 stops driving action of the accelerator rolls. The hydraulic cylinder 118 is then operated to lower the rectangular plate 122 while at the same time drive means (not shown), such as a solenoid, rotates the rods 123 to insert each pair of fingers 124 into the underlying plank. Reverse actuation of the hydraulic cylinder 118 then raises up the plank high enough to clear the loading tray 104. Forward movement of the carriage 92 by conventional drive means (not shown) transports the plank forwardly to a stacking position directly above the stacking device 96, where the plank is lowered into position on the stacking tray 126. The carriage 92 is then returned to its loading position where it picks up another plank which, by now, has been cut by the cutting blade 98 and accelerated forwardly by the accelerator rolls 90 into loading position, all as previously described. In order to achieve the desired multilayered structure having the laminae of adjacent strips perpendicular to each other, the gear housing 120 rotates every other plank 180° before depositing it in the stacking tray 126. After the first plank has been placed in the stacking device 96, the spray nozzle 130 is actuated in each instance while the plank being carried is still held by the fingers 124 at position 137, thereby causing the nozzle to traverse lengthwise in either a forward or rearward direction between the two opposing faces of adjacent planks. The rectangular plate 122 presses each plank down to provide a good bonding seal before the fingers 124 are removed from the plank. Operation of the lifting arms 128 downwardly in increments equal to the thickness of each plank while the carriage 92 is returning to pick up another plank serves to keep the upper surface of the top plank at the correct position immediately below the traversing path of the spray nozzle 130. Thus, the carriage 92 moves back and forth fast enough to avoid having to stop the continuous forward movement of glass fiber batting toward the loading tray 104.

It will be appreciated that the desired multilayered structure 14 could be assembled in accordance with the invention directly from a plurality of single-layered structures 12 without employing the exemplary apparatus for cutting and stacking planks, so long as adjacent strips of glass fiber have laminae essentially perpendicular to each other.

The apparatus for completing the bonding of the stacked plank members to each other to form the log structure 14 includes a platen 138 and a second oven 140. The platen 138 is carried on the forward end of a horizontal piston 142 seated in a hydraulic cylinder 144, and abuts the end of the stacked planks for the purpose of moving them forwardly through a forward extension 146 of the stacking device 96 into the second oven 140. An overhead pressure plate 148 is included inside the second oven 140 to securely hold the planks during curing, and is attached on the lower end of a piston 149 coupled to an actuating cylinder 150. Vertical doors 152 mounted on opposite ends of the oven 140 assure proper environmental conditions in the oven. As with the first oven 66, the adhesive and oven specifications have been specially chosen to facilitate quick fire-resistant bonding without interfering with the continuous forward movement of the glass fiber.

The aforementioned structure of the first and second ovens 66 and 140 and of the cutting and assembling apparatus assure that the upper and lower surfaces of horizontally adjacent glass fiber strips in the completed multilayered log structure are aligned in parallel horizontal linear planes, and that the two side surfaces of vertically adjacent glass fiber strips are aligned in parallel vertically linear planes.

The second lateral cutting device is located after the second oven 140 and includes entrance and exit doors 154, 156, a plurality of side clamping members 158, linear blades 160 and an ejection belt 162. The entrance doors and exit doors 154, 156 swing on side hinges 164 and the side clamping members 158 move in and out, all being actuated by suitable means, not shown. The linear blades 160 are preferably sharpened with a thin scalloped edge and are mounted on opposite sides of the log on a carrier 166, passing through upright slots in the side clamps 164. To avoid undue heat and damage in connection with cutting sections from the multilayered glass fiber log structure, the blades 160 are designed to travel only about two inches while moving downwardly completely through the log, with alternate blades moving in opposite directions. An underneath drive roll 168 is mounted laterally on the support frame for frictional engagement with the bottom plank of the log structure 14. The ejection belt 162 is also mounted underneath the log structure for forward movement and includes protruding lugs 170.

When the required number of planks have been sprayed with adhesive by nozzles 130 and accumulated in the stacking device 96, the hydraulic cylinder 144 is actuated, thereby causing the platen 138 to move the stack forwardly into the second oven 140, while at the same time pushing the cured log therein forwardly toward the second lateral cutter device. The oven doors 152 are opened automatically to allow the transfer, and, as they are closed with the new uncured log inside the oven, the cylinder 150 is actuated to provide strong downward pressure on the log through the pressure plate 148. The platen 138 is then retracted to its normal position to allow planks to again be placed in the loading tray 104 which has also returned to its starting position at the top of the stacking device 96. Meanwhile, the cured log is engaged by the drive roller 168 and pulled through the entrance doors 154 into position with its forward end contacting the closed exit doors 156. At this point, the clamping members 158 are moved inwardly to firmly contact the sides of the log, and the entrance doors 154 are closed to bring numerous short stabilizing pins 172 into penetrating contact with the rearward end of the log. The sectional cutting of the log in a plane parallel to the end of the log is then accomplished by moving the carrier 166 downwardly along vertical guide rods 174 to draw the blades 160 through the log as previously described. The carrier 166 is then returned upwardly to its initial position, the exit doors 156 opened, and the ejection belt 162 turned on to bring one of the lugs 170 in contact with the rearward end of the sliced log to move it forwardly out of a discharge chute 176.

It will therefore be appreciated in view of all the foregoing that a unique method and apparatus is provided for automatically and continuously fabricating multisectioned cushioning material out of a sheet of glass fiber batting, with all of the steps being performed in sequence as well as simultaneously at different locations along the assembly line.

Furthermore, the cushioning material of the invention is a substantial improvement over the prior art hand-made archetype. In this regard (see FIG. 6), the preferred method and apparatus produces a multisectioned material having a first set 178 of rectangular solid elements positioned diagonally from each other with substantially parallel glass fiber laminae, and a second set 180 of similar rectangular solid elements also positioned diagonally from each other with substantially parallel glass fiber laminae. The elements of set 178 are joined to the elements of set 180 with laminae of both sets essentially normal to each other, with junctions between rows of contiguous elements constituting two groups of parallel linear planes so that one group of junctions is normal to the other, and with the direction 182 of substantially uniform fiber alignment of each glass fiber element being in the direction 184 of primary load (see FIG. 8). A membrane 186 lying in the plane of the top and/or bottom surfaces of the multisectioned glass fiber material is attached to each glass fiber element to maintain the aforementioned positions of the glass fiber elements under normal and deflected conditions.

In this regard, it is desirable to minimize lateral displacement, bowing and buckling of fibers which may occur under load conditions, usually in directions normal to the laminae. Otherwise, non-uniform cushioning may result, as when upstanding fibers partially collapse and no longer exert a constant upward spring force against the load. The membrane 186 and abutting laminae of adjacent elements are designed to avoid this problem by holding the glass fibers in proper positions, thereby achieving a preferred ripple-type of fiber compression. Also, the membrane 186 maintains proper positioning of glass fiber elements, notwithstanding the separation of the adhesive bond joint, as at 188, which often occurs after repeated deflections of the cushioning material. The membrane 186 can be relatively rigid for increased stability and for spreading the load over a large area of cushioning material, or relatively flexible to allow a more natural load distribution.

Figure 7B:
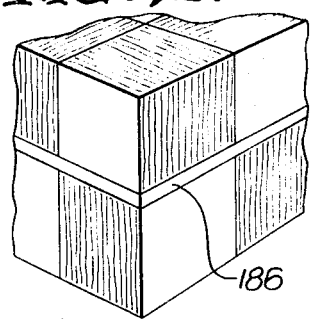
Figure 8:
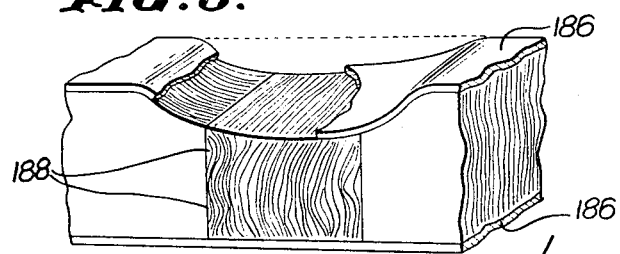
FIG. 8 shows a typical deflection of one form of improved cushioning material.
Figure 7C:
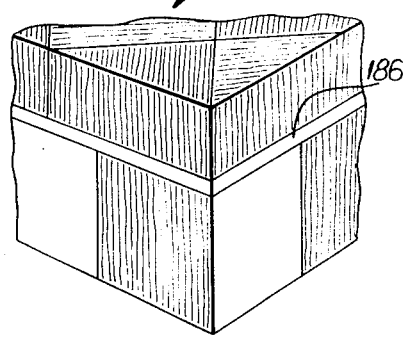

In order to achieve a full range of cushioning specifications, the improved cushioning material of FIGS. 6 and 8 can be varied and/or combined together, as shown in FIGS. 7A, 7B and 7C. In this regard, the structure of FIG. 7A provides two sets of glass fiber elements 178′ and 180′ which are elongated in the primary load direction 184. FIG. 7B shows a cushioning unit having two identical layers wherein the membrane 186 connects matching upper and lower surfaces of the two layers in a linear plane. In this form, equally sized upper and lower cubical glass fiber elements are in direct alignment with glass fiber laminae normal to each other. In the variation of FIG. 7C, the membrane 186 connects a second layer of shorter wider glass fiber elements to a first layer of cubical glass fiber elements such that the adjacent upper and lower laminae are rotated 45° relative to each other.

It will therefore be appreciated to those skilled in the art that the invention provides for variations in cross section (e.g., 1 x 1, 2 x 2), in column length (e.g., 2 x 2 x 3, 2 x 2 x 4), and in relative size and alignment of adjacent layers (e.g., laminae of adjacent layers parallel, perpendicular, or oblique), and in utilizing various forms of stabilizing and flexible membranes 186 between adjacent layers to achieve an infinite number of different load and deflection characteristics.

Figure 9:
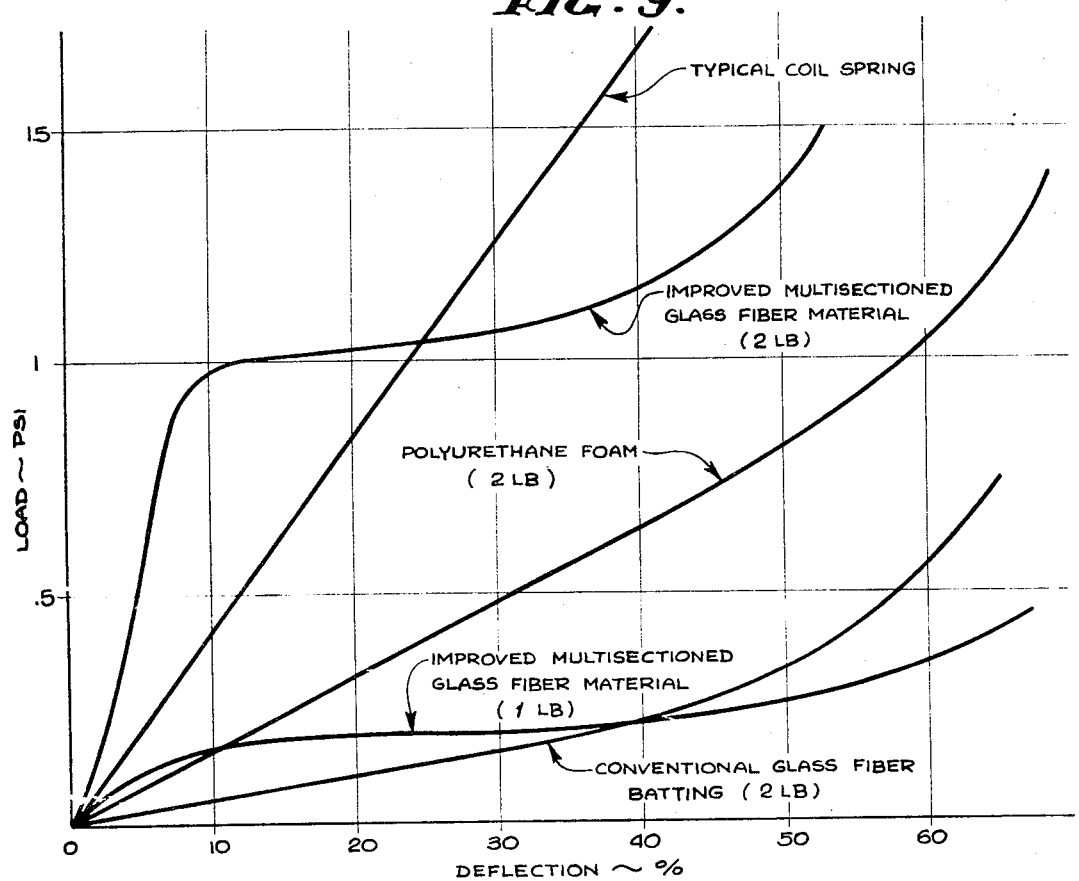
FIG. 9 shows two typical load deflection curves for the improved cushioning material as compared to typical load/deflection curves for conventional cushioning materials.

The improved performance of the cushioning material made in accordance with the aforementioned method and apparatus is an important feature of the invention. In this regard, FIG. 9 shows load/deflection curves for conventional flexible cushioning materials, including a typical coil spring, polyurethane foam (two pound per cubic foot density), and glass fiber batting (two pound density) loaded normal to the surface of the batting, and the contrasting load/deflection curves for the improved multisectioned glass fiber material of the invention (one and two pound density). The conventional materials provide a spring force against the load which increases approximately linearly with the relative deflection of the material, while the cushioning material of the invention provides a plateau in the range of about 15%–35% deflection where the spring force exerted against the load is substantially constant. This assures a more comfortable seat cushion for human cushioning, and enables a substantial reduction in package size with respect to cushioning products in transit or storage. In this latter regard, a person skilled in the art of cushioned packaging will be able to provide with multisectioned glass fiber cushioning material for an average deceleration force of about 80 to 90 percent of the maximum allowable deceleration force, rather than having to provide with conventional cushioning material for an average deceleration force of only about 50 percent of the allowable maximum. In terms of the graph, assuming a fixed upper load limit not to be exceeded, a given area under the load/deflection curve of a layer of polyurethane foam can be duplicated by a significantly thinner layer of improved multisectioned glass fiber material.

Although the present glass fiber batting materials, such as Textrafine made by PPG Industries and Ultralite made by Gustin Bacon, are commercially available for use with the invention, they are intended primarily as insulating material. Accordingly, they are generally unsatisfactory because they may possess over-cured or burned binder, voids, clumps of glass and binder, and non-uniform alignment of fiber, all of which adversely affect the cushioning properties of the glass fiber batting. In view of the present invention, it is anticipated that high quality glass fiber batting of varying dimensions and densites and having uniform alignment of fibers, preferably in the longitudinal direction, may become available in order to achieve the full capabilities of improved glass fiber multisectioned cushioning materials disclosed herein.

Although exemplary embodiments and variations thereof have been disclosed and discussed, it will be understood that other applications of the invention are possible and that the embodiments disclosed may be subjected to various additional changes, modifications and substitutions without necessarily departing from the spirit of the invention.

We claim as our invention:

1. A method of fabricating an improved cushioning material, including the steps of:
   continuously moving glass fiber with substantially horizontal laminae and a predetermined thickness in a forward direction;
   slitting said glass fiber into strips having widths equal to said predetermined thickness;
   orienting said strips in a single-layered structure so that laminae of adjacent strips are substantially normal to each other;
   reorienting a plurality of said single-layered structures into a multilayered structure so that laminae of adjacent strips are substantially normal to each other;
   slicing crosswise through said multilayered structure; and
   performing said slitting, orienting, reorienting and slicing steps sequentially and also simultaneously on different portions of said glass fiber as said glass fiber moves continuously in said forward direction.

2. The method of claim 1 wherein said orienting and reorienting steps include bonding adjacent strips to each other.

3. The method of claim 2 wherein said bonding steps include:
   applying adhesive to contiguous surfaces of adjacent strips;
   holding said contiguous surfaces in pressured contact; and
   curing said adhesive during said holding step.

4. The method of claim 1 wherein said slitting is done only in one direction, said orienting places said strips n positions parallel to and in contact with each other with upper and lower surfaces respectively aligned in parallel linear planes, and said reorienting places said single-layered structures in positions parallel to and in contact with each other with first and second side surfaces respectively aligned in parallel linear planes.

5. Apparatus for fabricating a multisectioned cushioning material from glass fiber with substantially horizontal laminae and a predetermined thickness, including in combination:
   a support frame;
   drive means on said support frame for continuously moving said glass fiber along a forward path;
   longitudinal cutter means on said support frame in said forward path and spaced at lateral intervals equal to said predetermined thickness for slitting said sheet into longitudinal strips;
   first assembly means on said support frame for assembling said longitudinal strips into a single-layered structure with laminae of adjacent strips substantially normal to each other;
   second assembly means on said support frame for assembling a plurality of said single-layered structures into a multilayered structure with laminae of adjacent strips substantially normal to each other; and
   lateral cutter means on said frame for cutting through said multilayered structure in a direction normal to said strips, with said first assembly means positioned between said longitudinal cutter means and said second assembly means, and with said second assembly means positioned between said first assembly means and said lateral cutter means.

6. The apparatus of claim 5 wherein said first and second assembly means each include means for bonding together contiguous surfaces of said strips.

7. The apparatus of claim 5 wherein said longitudinal cutter means includes:
   a plurality of circular blades; and
   means for rotating said circular blades so that the portion of said circular blades having cutting contact with said sheet is moving in the general direction of said forward path of said sheet and at a velocity slightly greater than said constant rate of travel of said sheets.

8. The apparatus of claim 5 wherein said first assembly means includes crosscut means for cutting across said single-layered structure to form a plank;
   control means connected to said crosscut means for actuating said crosscut means when a predetermined length of said single-layered structure has moved forwardly past said crosscut means.

9. The apparatus of claim 8 wherein said second assembly means includes means for moving each plank into a rearward loading position; and
   carriage means on said support frame for carrying said planks from said rearward loading position to a forward stacking position, including means for rotating alternate planks 180° during said carrying.

10. The apparatus of claim 5 wherein said lateral cutter means includes:
    a plurality of linear blades extending laterally across said multilayered structure; and
    means for reciprocating said linear blades through a short lateral distance with alternate blades travelling in opposite directions.

11. An improved cushioning material made from glass fiber batting having substantially parallel laminae with substantially uniform alignment of fibers in a given direction including:
    a first pair of rectangular solid elements disposed in diagonal relationship to each other in a reference plane with their respective laminae parallel to each other and with said given direction of substantially uniform fiber alignment normal to said reference plane;
    a second pair of rectangular solid elements similarly disposed in diagonal relationship to each other in said reference plane with their respective laminae parallel to each other and with said given direction of substantially uniform fiber alignment normal to said reference plane; and means for connecting said first pair with said second pair of rectangular solid elements to form a multisectioned unit such that each of said first pair has a side contiguous with each of said second pair, with said laminae of said first pair perpendicular to said laminae of said second pair, while maintaining said given direction of substantially uniform fiber alignment in all of said rectangular solid elements parallel to each other and normal to said reference plane.

12. The improved cushioning material of claim 11 wherein said top surfaces and said bottom surfaces of said rectangular solid elements lie in parallel planes, respectively, and wherein said means for connecting includes a membrane lying in one of said planes and connected to each of said rectangular solid elements.

13. The improved cushioning material of claim 12 including a plurality of said multisectioned units, and means for positioning said multisectioned units on top of each other with matching upper and lower surfaces in substantially the same plane.

14. The improved cushioning material of claim 11 wherein the spring force exerted by said multisectioned cushioning unit is substantially constant under deflections in the range of about 15%–35% in said given direction of substantially uniform fiber alignment.

References Cited

UNITED STATES PATENTS

| 2,373,500 | 4/1945 | Pearce | 156—260 |
| 2,922,559 | 1/1960 | Perry et al. | 161—151 X |
| 3,012,923 | 12/1961 | Slayter | 156—264 X |
| 3,493,452 | 2/1970 | Cole | 156—260 X |

WILLIAM A. POWELL, Primary Examiner

U.S. Cl. X.R.

156—260, 264, 266, 271, 304, 512, 517, 525; 161—39, 55, 60, 151